US009964453B2

(12) United States Patent
Babin et al.

(10) Patent No.: US 9,964,453 B2
(45) Date of Patent: May 8, 2018

(54) DEVICE AND METHOD FOR HIGH PRECISION FIBER-OPTIC TEMPERATURE PROFILE MEASUREMENTS IN LONG LENGTH AREAS

(71) Applicant: Optromix Company, Cambridge, MA (US)

(72) Inventors: Sergey A. Babin, Novosibirsk (RU); Alexey G. Kuznetsov, Novosibirsk (RU); Ivan S. Shelemba, Novosibirsk (RU)

(*) Notice: Subject to any disclaimer, the term of this patent is extended or adjusted under 35 U.S.C. 154(b) by 836 days.

(21) Appl. No.: 14/210,937

(22) Filed: Mar. 14, 2014

(65) Prior Publication Data
US 2015/0260588 A1 Sep. 17, 2015

(51) Int. Cl.
*G01K 11/32* (2006.01)
(52) U.S. Cl.
CPC ........ *G01K 11/32* (2013.01); *G01K 2011/324* (2013.01)
(58) Field of Classification Search
CPC combination set(s) only.
See application file for complete search history.

(56) References Cited

U.S. PATENT DOCUMENTS

| 4,767,219 A | 8/1988 | Bibby |
| 4,859,065 A | 8/1989 | Bibby |
| 5,639,162 A * | 6/1997 | Sai .................. G01K 11/32 250/227.18 |
| 6,606,148 B2 | 8/2003 | Fredin et al. |
| 7,057,714 B2 | 6/2006 | Fredin et al. |
| 7,350,972 B2 | 4/2008 | Seebacher et al. |
| 7,389,011 B2 | 6/2008 | Ogura et al. |
| 8,496,376 B2 | 7/2013 | Lee et al. |
| 2003/0133179 A1 * | 7/2003 | Islam .................. H01S 3/302 359/334 |

(Continued)

FOREIGN PATENT DOCUMENTS

RU 2413188 C2 2/2011

OTHER PUBLICATIONS

International Search Report from International Application No. PCT/IB2015/051826, filed Mar. 12, 2015, dated Jun. 25, 2015.

(Continued)

*Primary Examiner* — Lisa Caputo
*Assistant Examiner* — Nasir U Ahmed
(74) *Attorney, Agent, or Firm* — Law Office of Ilya Libenzon

(57) ABSTRACT

A high precision fiber-optic device and method are developed for measuring a temperature profile in a long length area. The temperature profile is derived based on a ratio between the intensities of anti-Stokes Raman and Stokes Raman backscattered components. The power output of the amplified pulsed optical radiation delivered to the sensing optical fiber via a reference optical fiber, is controlled such as to maintain a substantially fixed intensity level of the anti-Stokes Raman component of the optical radiation back scattered from the reference optical fiber. Controlling the output power of the of the amplified pulsed optical radiation is carried out based on a feedback representative of the intensity level of the anti-Stokes Raman component of the optical radiation back scattered from the reference optical fiber.

11 Claims, 2 Drawing Sheets

(56) References Cited

U.S. PATENT DOCUMENTS

| | | | |
|---|---|---|---|
| 2005/0140966 A1 | 6/2005 | Yamate et al. | |
| 2007/0058897 A1* | 3/2007 | Yong | G01D 5/35303 |
| | | | 385/12 |
| 2007/0165691 A1 | 7/2007 | Taverner et al. | |
| 2007/0223556 A1 | 9/2007 | Lee et al. | |
| 2007/0280329 A1* | 12/2007 | Kawauchi | G01J 5/08 |
| | | | 374/131 |
| 2009/0252193 A1 | 10/2009 | Hill et al. | |
| 2010/0111136 A1* | 5/2010 | Huang | G01D 5/35303 |
| | | | 374/161 |
| 2011/0231135 A1 | 9/2011 | Suh et al. | |
| 2011/0280277 A1* | 11/2011 | Chung | G01K 11/32 |
| | | | 374/137 |
| 2013/0028289 A1* | 1/2013 | Zhang | G01K 11/32 |
| | | | 374/161 |
| 2013/0100984 A1 | 4/2013 | Agawa | |

OTHER PUBLICATIONS

Lee, Chung E., Fiber-Optic Sensing: Self-calibrating technique enables long-distance temperature sensing, Laser Focus World, Aug. 2007.

* cited by examiner

DEVICE AND METHOD FOR HIGH PRECISION FIBER-OPTIC TEMPERATURE PROFILE MEASUREMENTS IN LONG LENGTH AREAS

FIELD OF THE INVENTION

The present invention relates generally to distributed temperature sensing. In particular, the present invention is directed to fiber-optic systems and methods for measuring temperature profiles in long length areas.

BACKGROUND OF THE INVENTION

As known in the art, in accordance with the distributed temperature sensing (DTS) technique, temperatures are recorded along a sensing optical fiber positioned in a long length area of interest as a continuous profile, wherein the area length could be greater than 30 km. In a typical time-domain DTS device pulsed optical radiation from a light source is directed into the sensing optical fiber, which leads to spontaneous Raman back-scattering. Stokes components of the Raman back-scattering have a lower frequency than the optical radiation from the light source, wherein Anti-Stokes components have a higher frequency than the optical radiation from the light source. The back-scattered optical radiation is analyzed to obtain a temperature profile of the area of interest. Since the intensity of anti-Stokes back-scattered optical radiation is highly dependent on temperature, the temperature profile is derived based on a ratio between the intensities of anti-Stokes Raman and Stokes Raman backscattered components.

A major problem inherent to known DTS measurement systems is providing high accuracy of temperature determination. Known solutions for providing high accuracy temperature measurements include adjusting the attenuation profile of the Stokes component to that of the anti-Stokes component to compensate the difference in the attenuation profiles of these components. This adjustment is made in the assumption of the components having a smooth exponential attenuation profile, which may not always be a reality.

Other solutions use two additional optical radiation sources: one in the Stokes frequency of the primary optical source and the other in the anti-Stokes frequency of the primary optical source. As a result, Rayleigh backscattered optical radiation components are generated on the Stokes and Anti-Stokes frequency, which are used for correction of the attenuation profile of the back-scattered Stokes and anti-Stokes optical radiation. However, this approach brings additional cost and complexity to the device, the latter being especially challenging in field applications.

Another known solution is to use a reference optical fiber with predetermined optical properties connected to the sensing optical fiber, which allows for self calibrating of the measurement device and hence more accurate measuring of temperature profiles. This solution does not however take care of additional attenuation alteration which may occur due to various environmental changes.

Thus a need still exists for a more cost-effective and more convenient in field applications high precision fiber-optic system and method for measuring temperature profiles in long length areas.

SUMMARY OF THE INVENTION

In accordance with the present application, there is provided a high precision fiber-optic device for measuring a temperature profile in a long length area.

Further, in accordance with the present application, there is provided a method for high precision optical measurement of a temperature profile in a long length area.

Still further, in accordance with one embodiment of the present invention, there is provided a high precision fiber-optic device for measuring a temperature profile in a long length area, comprising a source of pulsed optical radiation having a first operating wavelength, optical amplifying means with a controllable power output, a bidirectional optical filter, and directional means. The directional means is optically coupled with the source of pulsed optical radiation and adapted for directing the optical radiation from the source of pulsed optical radiation to the optical amplifying means, and for directing the amplified pulsed optical radiation from the amplifying means to a first port of the bidirectional optical filter. Further comprised in the high precision fiber-optic device is a sensing optical fiber positioned in the long length area, and a reference optical fiber having a proximal end and a distal end, the proximal end being connected to a second port of the bidirectional optical filter, wherein the distal end of the reference optical fiber is connected to a proximal end of the sensing optical fiber. Also comprised in the high precision fiber-optic device is a time domain optoelectronic registering means optically coupled with the bidirectional optical filter via a third and a forth ports of the optical bidirectional filter and comprising data processing and displaying means. The bidirectional optical filter is configured for delivering the amplified pulsed optical radiation from the first port to the second port, and for delivering Stokes and anti-Stokes Raman components of optical radiation back scattered along the reference optical fiber and back scattered along the sensing optical fiber, from the second port to the third and forth ports, respectively. The sensing and reference optical fibers are adapted for the pulsed optical radiation and respective Raman components of the back scattered optical radiation to propagate therethrough.

In one embodiment of the present invention, the optical amplifying means is in electrical communication with the optoelectronic registering means, wherein the optoelectronic registering means is adapted to provide a feedback representative of an intensity level of an anti-Stokes Raman component of the optical radiation back scattered from the reference optical fiber, and wherein the power output of the optical amplifying means is controlled such as to maintain a substantially fixed intensity level of the anti-Stokes Raman component of the optical radiation back scattered from the reference optical fiber.

In another embodiment of the present invention, the power output of the optical amplifying means is controlled such as to maintain a substantially fixed intensity level of an anti-Stokes Raman component of an optical radiation back scattered from a predetermined point of the reference optical fiber.

In a specific embodiment of the present invention, the predetermined point of the reference optical fiber is the proximal end of the reference optical fiber.

In another specific embodiment of the present invention, the predetermined point of the reference optical fiber is the proximal end of the reference optical fiber.

Further, in accordance with one embodiment of the present invention, the optical amplifying means is an erbium-doped fiber amplifier and comprises a laser pump diode having a second operating wavelength, a directional coupler, an erbium-doped fiber, and a fiber Bragg grating, wherein the laser pump diode and the fiber Bragg grating are in optical communication with one end of the erbium-doped fiber via the directional coupler, and wherein another end of the erbium-doped fiber is in optical communication with the source of pulsed optical radiation and with the first port of the bidirectional optical filter via the directional means.

Yet further, in accordance with one embodiment of the present invention, the time domain optoelectronic registering means comprises at least two photodetectors optically coupled with corresponding third and forth ports of the optical bidirectional filter, the at least two photodetectors being in electrical communication with the data processing and displaying means.

In one embodiment of the present invention, the reference optical fiber has a predetermined length and predetermined optical properties, wherein a length of the sensing optical fiber significantly exceeds the length of the reference optical fiber.

In another embodiment of the present invention, the optical properties of the reference optical fiber are substantially identical to optical properties of the sensing optical fiber.

In another embodiment of the present invention, the reference fiber is placed in a thermostat control environment.

The reference optical fiber is preferably connected with the sensing optical fiber via an optical connector.

Further, in accordance with an alternate embodiment of the present invention, there is provided a method for optical measurement of a temperature profile in a long length area with a sensing optical fiber positioned in the long length area, comprising the steps of: generating a pulsed optical radiation; amplifying the pulsed optical radiation while controlling the amplified pulsed optical radiation power; amplifying the pulsed optical radiation while controlling an output power of amplified pulsed optical radiation; delivering the amplified pulsed optical radiation to a reference optical fiber sequentially connected with the sensing optical fiber; delivering Stokes and anti-Stokes Raman components of optical radiation back scattered along the reference optical fiber and back scattered along the sensing optical fiber for data processing and registering; and performing time domain registration and data processing to obtain the temperature profile in the long length area.

In one embodiment of the present invention, the step of amplifying and controlling the output power of the pulsed optical radiation is performed based on maintaining a substantially fixed intensity level of an anti-Stokes Raman component of an optical radiation back scattered from the reference optical fiber.

In another embodiment of the present invention, the step of amplifying and controlling the output power of the pulsed optical radiation is performed based maintaining a substantially fixed intensity level of an anti-Stokes Raman component of an optical radiation back scattered from a predetermined point of the reference optical fiber.

In one specific embodiment of the present invention the step of amplifying and controlling the pulsed optical radiation power is performed with the predetermined point of the reference optical fiber being the proximal end of the reference optical fiber.

In another specific embodiment of the present invention, the step of amplifying and controlling the pulsed optical radiation power is performed with the predetermined point of the reference optical fiber being the distal end of the reference optical fiber.

Still other objects and aspects of the present invention will become readily apparent to those skilled in this art from the following description wherein there are shown and described preferred embodiments of this invention, simply by way of illustration of the best modes suited for to carry out the invention. As it will be realized by those skilled in the art, the invention is capable of other different embodiments and its several details are capable of modifications in various obvious aspects all without departing from the scope of the subject application. Accordingly, the drawings and description will be regarded as illustrative in nature and not as restrictive.

BRIEF DESCRIPTION OF THE DRAWINGS

The accompanying drawings incorporated in and forming a part of the specification, illustrate the present invention, and together with the description serve to explain the principles of the invention.

DETAILED DESCRIPTION OF THE PREFERRED EMBODIMENTS

The present invention is directed to a high precision fiber-optic device for measuring a temperature profile in a long length area. The subject application is also directed to a method for high precision optical measurement of a temperature profile in a long length area.

Figure 1:
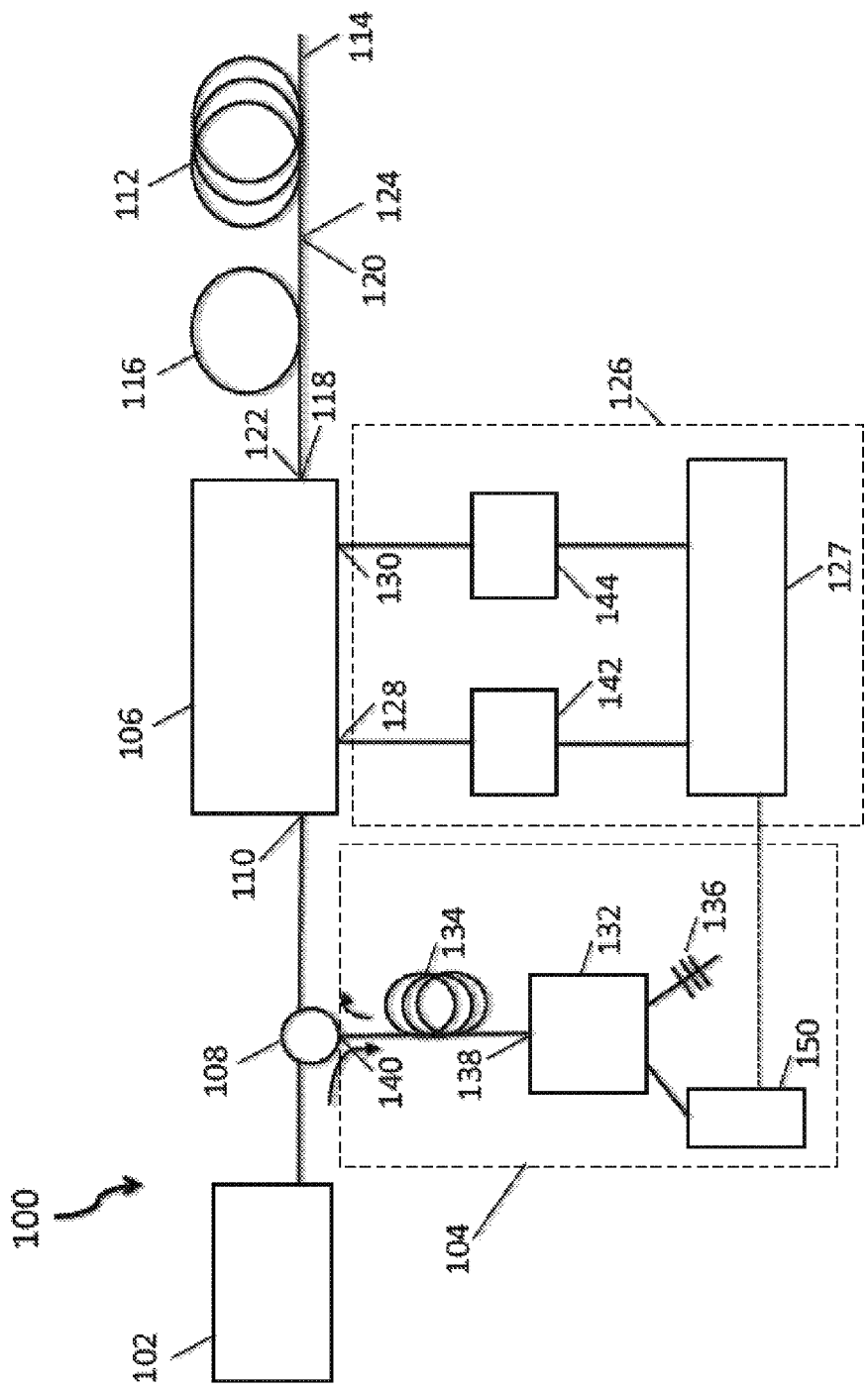
FIG. 1 is a functional layout of a high precision fiber-optic device for measuring a temperature profile in a long length area according to one embodiment of the present invention.
Figure 2:
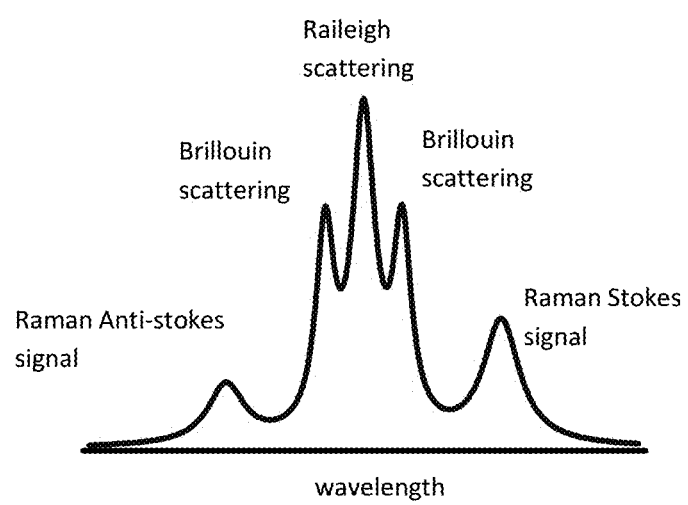
FIG. 2 is an illustration of the optical radiation back scattered along the sequentially connected reference optical fiber and sensing optical fiber.

Referring now to FIG. 1, there is shown a functional layout of a high precision fiber-optic device for measuring a temperature profile in a long length area in accordance with one embodiment of the present invention. As shown in FIG. 1, the fiber-optic device 100 includes a source 102 of pulsed optical radiation, optical amplifying means 104 with a controllable power output, a bidirectional optical filter 106, and a directional means 108 optically coupled with the source 102 of pulsed optical radiation. In a preferred embodiment, the source 102 operates at a wavelength of 1550 nm with pulse duration of 20 ns, power output of about 1 mW, and bandwidth of about 0.1 nm. A skilled artisan will appreciate that the source 102 is capable of being implemented as, for example, and without limitation, a light-emitting diode (LED). It will be also appreciated, that the directional means 108 is capable of implementation, for example, and without limitation, as a circulator or a directional coupler, as known in the art. The directional means 108 is adapted for directing the pulsed optical radiation from the source 102 to the optical amplifying means 104, and for directing the amplified pulsed optical radiation from the amplifying means 104 to a first port 110 of the bidirectional optical filter 106. The fiber-optic device 100 further includes a sensing optical fiber 112 positioned in the long length area 114, and a reference optical fiber 116 having a proximal end 118 and a distal end 120. The proximal end 118 of the reference optical fiber 116 is connected to a second port 122 of the bidirectional optical filter 106. The distal end 120 of the reference optical fiber 116 is connected to a proximal end 124 of the sensing optical fiber 112. Further included in the fiber-optic device 100 is a time domain optoelectronic registering means 126 optically coupled with the bidirectional optical filter 106 via a third 128 and a forth 130 ports of the optical bidirectional filter 106. The time domain optoelectronic registering means 126 includes data processing and displaying means 127.

In the embodiment depicted in FIG. 1, the bidirectional optical filter 106 is configured for delivering the amplified pulsed optical radiation from the first port 110 to the second port 122, and for delivering Stokes and anti-Stokes Raman components of optical radiation back scattered along the reference optical fiber 116 and back scattered along the sensing optical fiber 112, from the second port 122 to the third and forth ports 128, 130, respectively. The sensing and reference optical fibers 112, 116 are adapted for the pulsed optical radiation and respective Raman components of the back scattered optical radiation to propagate therethrough.

Further, in the embodiment depicted in FIG. 1, the optical amplifying means 104 is in electrical communication with the optoelectronic registering means 126 and is adapted for maintaining a substantially fixed intensity level of the anti-Stokes Raman component of an optical radiation back scattered from a predetermined point of the reference optical fiber 116. The predetermined point of the reference optical fiber 116 may be the proximal end 118 of the reference optical fiber 116. In a preferred embodiment, as depicted in FIG. 1, the optical amplifying means 104 is an erbium-doped fiber amplifier and may include a laser pump diode 150 operating at a wavelength of 976 nm with an output of about 100 mW, a directional coupler 132, an erbium-doped fiber 134, and a fiber Bragg grating 136. The laser pump diode 150 and the fiber Bragg grating 136 are in optical communication with one end 138 of the erbium-doped fiber 134 via the directional coupler 132, wherein another end 140 of the erbium-doped fiber 134 is in optical communication with the source 102 of pulsed optical radiation and with the first port 110 of the bidirectional optical filter 106 via the directional means 108. One skilled in the art will appreciate, that in a preferred embodiment the type of the laser pump diode 150 and the length of the erbium-doped optical fiber 134 are selected such as to provide an amplified pulsed optical radiation with a peak power of about 500 mW. The fiber Bragg grating 136 is a distributed Bragg reflector, as known in the art, and in a preferred embodiment is constructed to reflect the optical radiation at the operating wavelength of 1550 nm for amplification and block the optical radiation at the operating wavelength of 976 nm of the laser pump diode 150 . In a specific embodiment, the erbium-doped optical fiber 134 has a core of 4 .mu.m with a cladding diameter of 125 .mu.m. As will be also appreciated by one skilled in the art, temperature stabilization of the laser pump diode 150 is preferably provided (not shown) to avoid random fluctuations of the operating wavelength.

The time domain optoelectronic registering means 126 of the embodiment shown in FIG. 1 is adapted to provide a feedback representative of an intensity level of an anti-Stokes Raman component of the optical radiation back scattered from the reference optical fiber. The time domain optoelectronic registering means 126 comprises two photo-detectors 142, 144 optically coupled with corresponding third and forth ports 128, 130 of the optical bidirectional filter 106. The photodetectors 142, 144 are in electrical communication with the data processing and displaying unit 128. It will appreciated, that the time domain optoelectronic registering means 126 is capable of implementation as any suitable registering unit known in the art.

The reference optical fiber 116 has a predetermined length and predetermined optical properties, wherein the length of the sensing optical fiber 112 significantly exceeds the length of the reference optical fiber 116. In a specific embodiment, the length of the reference optical fiber 116 may be, for example, 100 m, wherein the length of the sensing optical fiber 112 may be from 4 to 15-20 km. The optical properties of the reference optical fiber 116 are, preferably, substantially identical to the optical properties of the sensing optical fiber 112. The reference and sensing optical fibers 116, 112 may be made of standard multimode optical fiber used for communications, as known in the art. As will be appreciated by one skilled in the art, the sensing and reference optical fibers 112, 116 may have a fiber core of 62.5 μm, or 50 μm. The reference optical fiber 116 may be connected with the sensing optical fiber 112 by any suitable method, such as fusion splicing, welding, and the like. The reference optical fiber 116 may be also connected with the sensing optical fiber 112 via an optical connector (not shown in FIG. 1), which may be implemented as any suitable optical connector known in the art. The reference fiber 116 may be placed in a thermostat control environment (not shown).

The operation of the high precision fiber-optic device 100 for measuring a temperature profile in a long length area in accordance with the present application will be best understood from the following description of carrying out the method for optical measurement of a temperature profile in a long length area in accordance with the present application.

Referring now to FIG. 1, the method begins with providing a pulsed optical radiation, for example and without limitation, at a wavelength of 1550 nm from the source 102. The pulsed optical radiation generated by the source 102 is directed by the directional means 108 to the amplifying means 104. The amplified pulsed optical radiation from the amplifying means 104 is then directed to a first port 110 of the bidirectional optical filter 106. The bidirectional optical filter 106 is configured for delivering the amplified pulsed optical radiation from the first port 110 to the second port 122. The amplified pulsed optical radiation is thereby delivered to the reference optical fiber 116 and then propagates along the reference 116, and along the sensing optical fiber 112, sequentially connected to the reference optical fiber 112.

Optical radiation back scattered along the reference optical fiber 116 and back scattered along the sensing optical fiber 112 includes Rayleigh, Raman (Stokes and anti-Stokes), and Brillouin components. These components of the back scattered optical radiation propagate along the sensing and reference optical fibers 112, 116. As known in the art, the back scattered Rayleigh component has the wavelength of the pulsed optical radiation delivered into the sequentially connected reference and sensing optical fibers 116, 112. This component is not sensitive to temperature and is not used in the present invention. The back scattered Rayleigh component passes through the bidirectional optical filter 106 from the second port 122 to the first port 110 and further to the directional means 108. As will be recognized by one skilled in the art, the directional means 108 is adapted for preventing the back scattered Rayleigh component from propagating further to the source 102 and to the amplifying means 104. The Brillouin backscattering components are spectrally so close to the back scattered Rayleigh component that separating the Brillouin components from the Rayleigh component is extremely difficult and not practical. As will be further appreciated by those skilled in the art, the intensity of the anti-Stokes component is highly dependent on temperature, which is not the case for the Stokes component. As also known in the art, the Stokes Raman components of the optical radiation back scattered along the sensing and reference optical fibers 112, 116 are in a bandwidth of 1570-1700 nm, while the anti-Stokes components of the optical radiation back scattered along the sensing and reference optical fibers 112, 116 are in a bandwidth of 1440-1540 nm.

Thus the bidirectional optical filter 106 delivers the Stokes and anti-Stokes Raman components of the optical radiation back scattered along the sensing and reference optical fibers 112, 116 to the time domain optoelectronic registering means 126 for data processing and registering to obtain the temperature profile in the long length area. The photodetectors 142, 144 of the time domain optoelectronic registering means 126 produce corresponding voltages representative of intensities the Stokes and anti-Stokes Raman components. The time domain optoelectronic registering means 126 performs time domain optoelectronic registration of the intensities of the Stokes and anti-Stokes Raman components wherein the temperature profile in the long length area is obtained based on the intensity ratio of the anti-Stokes and Stokes Raman components, as a function of distance.

The temperature at a given point of the sensing optical fiber 112 is calculated in accordance with equation (1), as follow:

$$T = \frac{h\nu}{k_B \ln\left[\frac{I_{as}(T)}{I_s(T)}\left(\frac{\lambda_{as}}{\lambda_s}\right)^4\right]}, \quad (1)$$

where:

$I_{as}$ and $I_s$ are, correspondingly, intensities of the Stokes and anti-Stokes Raman components, back scattered from the given point of the sensing optical fiber 112;

$\lambda_{as}$ and $\lambda_s$ are, correspondingly, anti-Stokes and Stokes wavelengths;

k is Boltzmann's constant; and h is Planck's constant.

As will be appreciated by one skilled in the art, various environmental changes may lead to attenuation alteration of the backscattered Raman components, and hence to insufficient accuracy in the temperature profiles measurements. In the present invention, controlling the power output of the optical amplifying means 104 provides for a high precision measuring of the temperature profile in a long length area. Controlling the output power of the optical amplifying means 104 is carried out based on a feedback representative of an intensity level of an anti-Stokes Raman component of the optical radiation back scattered from the reference optical fiber 116, provided by the optoelectronic registering means 126. The output power of the optical amplifying means 104 is controlled such as to maintain a substantially fixed intensity level of the anti-Stokes Raman component of an optical radiation back scattered from the reference optical fiber 116.

In a specific embodiment, the power output of the optical amplifying means 104 is controlled such as to maintain a substantially fixed intensity level of an anti-Stokes Raman component of an optical radiation back scattered from a predetermined point of the reference optical fiber 116. This predetermined point may be chosen, for example, as the proximal end 122, or as the distal end 120 of the reference optical fiber 116.

The foregoing description of preferred embodiments of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the current application in various embodiments and with various modifications as are suited to the particular use contemplated. All such modifications and variations are within the scope of the subject application as determined by the appended claims, when interpreted in accordance with the breadth to which they are fairly, legally and equitably entitled.

What is claimed is:

1. A high precision fiber-optic device for measuring a temperature profile in a long length area, comprising:
   a source of pulsed optical radiation having a first operating wavelength;
   optical amplifying means with a controllable power output;
   a bidirectional optical filter;
   directional means optically coupled with the source of pulsed optical radiation and adapted for directing the optical radiation from the source of pulsed optical radiation to the optical amplifying means, and for directing the amplified pulsed optical radiation from the amplifying means to a first port of the bidirectional optical filter, wherein the source is electrically connected to the directional means;
   a sensing optical fiber positioned in the long length area;
   a reference optical fiber having a proximal end and a distal end, the proximal end being connected to a second port of the bidirectional optical filter; wherein the distal end of the reference optical fiber is connected to a proximal end of the sensing optical fiber; and
   time domain optoelectronic registering means optically coupled with the bidirectional optical filter via a third and a fourth ports of the optical bidirectional filter and comprising data processing and displaying means, wherein the data processing and displaying means is electrically connected to the optical amplifying means, wherein the first port of the bidirectional optical filter is electrically connected to the directional means, so that the directional means is located between the source and bidirectional optical filter, wherein the bidirectional optical filter is configured for delivering the amplified pulsed optical radiation from the first port to the second port, and for delivering Stokes and anti-Stokes Raman components of optical radiation back scattered along the reference optical fiber and back scattered along the sensing optical fiber, from the second port to the third and fourth ports, respectively, and wherein the sensing and reference optical fibers are adapted for the pulsed optical radiation and respective Raman components of the back scattered optical radiation to propagate therethrough, wherein the optical amplifying means is electrically connected to the directional means, and the optical amplifying means is located at a place different from the source and the bidirectional optical filter.

2. The fiber-optic device of claim 1, wherein the optical amplifying means is in electrical communication with the optoelectronic registering means, wherein the optoelectronic registering means is adapted to provide a feedback representative of an intensity level of an anti-Stokes Raman component of the optical radiation back scattered from the reference optical fiber, and wherein the power output of the optical amplifying means is controlled such as to maintain a substantially fixed intensity level of the anti-Stokes Raman component of the optical radiation back scattered from the reference optical fiber.

3. The fiber-optic device of claim 2, wherein the power output of the optical amplifying means is controlled such as to maintain a substantially fixed intensity level of an anti- Stokes Raman component of an optical radiation back scattered from a predetermined point of the reference optical fiber.

4. The fiber-optic device of claim 3, wherein the predetermined point of the reference optical fiber is the proximal end of the reference optical fiber.

5. The fiber-optic device of claim 3, wherein the predetermined point of the reference optical fiber is the distal end of the reference optical fiber.

6. The fiber-optic device of claim 2, wherein the optical amplifying means is an erbium-doped fiber amplifier and comprises a laser pump diode having a second operating wavelength, a directional coupler, an erbium-doped fiber, and a fiber Bragg grating, wherein the laser pump diode and the fiber Bragg grating are in optical communication with one end of the erbium-doped fiber via the directional coupler, and wherein another end of the erbium-doped fiber is in optical communication with the source of pulsed optical radiation and with the first port of the bidirectional optical filter via the fiber-optic directional means.

7. The fiber-optic device of claim 1, wherein the time domain optoelectronic registering means comprises at least two photodetectors optically coupled with corresponding third and forth ports of the optical bidirectional filter, the at least two photodetectors being in electrical communication with the data processing and displaying means.

8. The fiber-optic device of claim 1, wherein the reference optical fiber has a predetermined length and predetermined optical properties, wherein a length of the sensing optical fiber significantly exceeds the length of the reference optical fiber.

9. The fiber-optic device of claim 8, wherein the optical properties of the reference optical fiber are substantially identical to optical properties of the sensing optical fiber.

10. The fiber-optic device of claim 1, wherein the reference fiber is placed in a thermostat control environment.

11. The fiber-optic device of claim 1, wherein the reference optical fiber is connected with the sensing optical fiber via an optical connector.

* * * * *